United States Patent [19]

Inoue

[11] Patent Number: 5,038,898
[45] Date of Patent: Aug. 13, 1991

[54] DRUM BRAKE
[75] Inventor: Takashi Inoue, Saitama, Japan
[73] Assignee: Akebono Brake Industry Co., Ltd., Tokyo, Japan
[21] Appl. No.: 524,018
[22] Filed: May 16, 1990
[30] Foreign Application Priority Data May 16, 1989 [JP] Japan .................................. 1-55255[U]

[51] Int. Cl.⁵ ............................................. F16D 51/00
[52] U.S. Cl. ................................. 188/328; 188/79.51; 188/79.64; 188/106 F; 188/79.54
[58] Field of Search ............ 188/327, 328, 329, 106 F, 188/106 A, 79.51, 79.54, 79.56, 79.63, 79.64, 2 D, 196 BA, 196 R

[56] References Cited
U.S. PATENT DOCUMENTS 3,666,058  5/1972  Quiney ........................ 188/79.51 X
4,139,083  2/1979  Hoshino et al. ................ 188/79.54
4,842,104  6/1989  Harmer ........................ 188/79.64 X
4,872,533 10/1989  Boyer et al. .................. 188/106 F X Primary Examiner—Douglas C. Butler
Attorney, Agent, or Firm—Cushman, Darby & Cushman

[57] ABSTRACT

The present invention involves an improvement in a conventional drum brake assembly which utilizes a pair of brake shoes separated by an adjustable strut. A parking brake lever is pivotally attached to one of the brake shoes and when it is rotated in a braking direction, causes both brake shoes to expand by interacting with the adjustable strut. A plate spring attached to a backing plate allows the parking brake lever to pass in the braking direction after assembly of the drum brake, thereby removing slack and properly adjusting the drum brake. The plate spring can be displaced from outside the drum brake to allow the parking brake lever to pass in the opposite direction for disassembly of the drum brake.

2 Claims, 2 Drawing Sheets

DRUM BRAKE

BACKGROUND OF THE INVENTION

1. Field of the Invention

The present invention relates to a drum brake used for braking cars and specifically, to the assembling operation of such a drum brake.

2. Description of the Related Art

A drum brake such as shown in FIG. 5 (Prior Art) has been known for use in braking cars.

Such a drum brake comprises: a brake drum (not shown) that rotates along with the wheel; a backing plate 1 fixed on a suspension system; a pair of brake shoes 3a and 3b that are displaceably supported by the backing plate 1 and pressed onto the inner peripheral surface of the brake drum by being expanded by a wheel cylinder 2 fixed on the backing plate 1; a parking lever 4, one end of which (upper end as viewed in FIG. 5 (Prior Art)) is pivotally supported by one brake shoe 3b (right as viewed in FIG. 5 (Prior Art)) and through a pivot pin 8 and the other end of which (lower end as viewed in FIG. 5 (Prior Art)) is connected to a cable (not shown) for operating the parking brake mechanism; and a strut 6, one end of which (right end as viewed in FIG. 5 (Prior Art)) is abutted against the middle of the parking lever 4 and the other end of which (left end as viewed in FIG. 5 (Prior Art)) is abutted against the other brake shoe 3a (left as viewed in FIG. 5 (Prior Art)). The strut 6 has a built-in automatic gap adjusting device for adjusting the gap between the outer peripheral surfaces of the respective brake shoes 3a and 3b and the inner peripheral surface of the brake drum as the linings 5 of the brake shoes 3a and 3b wear.

To effect braking by the drum brake thus constructed, the distance between the single ends (upper end as viewed in FIG. 5 (Prior Art)) of the pair of brake shoes 3a and 3b are expanded by the wheel cylinder 2 arranged on the backing plate 1. Both brake shoes 3a and 3b are displaced toward the outside of the backing plate 1, pivoting around an anchor 7 fixed on the backing plate 1. The outer peripheral surfaces of the linings 5 of the brake shoes 3a and 3b are pressed against the inner peripheral surface of the brake drum, thereby causing a braking force to be produced by the friction between these surfaces. To release the braking force, the supply of hydraulic oil to the wheel cylinder 2 is interrupted and the brake shoes 3a and 3b are returned to their original position by a return spring 9, thereby disengaging the outer peripheral surfaces of the linings 5 from the inner peripheral surface of the brake drum.

To operate the parking brake, the other end (lower end as viewed in FIG. 5 (Prior Art)) of the parking lever 4 is pulled toward the left by the cable, thereby causing the parking lever 4 to pivot clockwise around the pivot pin 8 as viewed in FIG. 5 (Prior Art). As a result, the strut 6, one end of which abuts against the middle of the parking lever 4, is pushed toward the left as viewed in FIG. 5 (Prior Art), thereby pushing the brake shoe 3a against which the other end of the strut 6 abuts, toward the outside, thus pushing the outer peripheral surface of the lining 5 of brake shoe 3a against the inner peripheral surface of the brake drum.

At the same time, as a reaction, the pivot pin 8 supporting one end of the parking lever 4 is displaced toward the outside causing the brake shoe 3b on which the pivot pin 8 is arranged to be pushed outward, thus pushing the outer peripheral surface of the lining 5 of brake shoe 3b against the inner peripheral surface of the brake drum. As a result, the outer peripheral surfaces of the linings 5 of both brake shoes 3a and 3b are pressed against the inner peripheral surface of the brake drum, thereby producing a braking force by the friction between the surfaces.

In a case where the linings 5 are worn as a result of repeated braking operations and the gap between the outer peripheral surfaces of the linings 5 and the inner peripheral surface of the brake drum is increased, the automatic gap adjusting device built into strut 6 causes strut 6 to expand, thereby maintaining the gap within a prescribed range.

In a drum brake thus constructed and operated, both the linings 5 and the inner peripheral surface of the brake drum (in a far smaller degree than the linings) wear as a result of the repeated braking operations. The wear is located only where the linings 5 contact the drum and takes the form of a so-called "stepped wear," in which a stepped groove is observed with respect to the other portions of the inner peripheral surface of the brake drum. In a case where such stepped wear is present and becomes larger than a proper gap between the outer peripheral surfaces of the linings 5 and the inner peripheral surface of the brake drum, the engagement of the side end of each of the linings 5 with the step prevents the removal of the brake drum, thereby preventing the brake shoes 3a and 3b from being replaced.

For this reason, the conventional brake drum is so constructed that it can be removed even when the stepped wear is present by turning the parking lever 4 in a direction opposite to that in the braking operation (counterclockwise as viewed in FIG. 5 (Prior Art)) through an operation performed outside the backing plate 1. As shown in FIG. 6 (Prior Art), a stopper strip 10 is fixed at a location which is part of the backing plate 1 and through which the other end (lower end as viewed in FIG. 5 (Prior Art)) of the parking lever 4 passes. Normally, the amount of rotation of the parking lever 4 in the direction of releasing the braking force is restricted by this stopper strip 10. When removing the brake drum, this stopper strip 10 is removed, thereby increasing the gap between the inner peripheral surface of the brake drum and the outer peripheral surfaces of the linings 5.

To remove the brake drum so as to replace the brake shoes 3a and 3b, a pin 11 supporting the stopper strip 10 is removed from outside the backing plate 1. Then the stopper strip 10 is removed from the backing plate 1. As a result, the parking lever 4 is turned around the pivot pin 8 counterclockwise as viewed in FIG. 5 (Prior Art). The force expanding the pair of brake shoes 3a and 3b is released through the strut 6. The gap between the outer peripheral surfaces of the linings 5 and the inner peripheral surface of the brake drum increases in excess of the proper range so that the brake drum can be removed even if stepped wear is present on the inner peripheral surface of the brake drum.

However, the conventional drum brake thus constructed and operated presents several shortcomings. Since the stopper strip 10 and the backing plate 1 are formed in separate pieces, there is a risk of forgetting to mount the stopper strip 10. Once the strut 6 has been expanded without the stopper strip 10 (i.e., if the gap between the linings 5 and the brake drum has been adjusted), the brake drum can no longer be removed.

To assemble the drum brake, on the other hand, the other end (lower end as viewed in FIG. 5 (Prior Art)) of the parking lever 4 is located further left than the stopper strip 10 as viewed in FIG. 6 (Prior Art), and it is necessary to pull the other end of the parking lever 4 with a cable. Once the drum brake has been assembled with the other end being mistakenly located on the side opposite the stopper strip 10 (right as viewed in FIG. 6 (Prior Art)), the parking lever 4 can no longer be turned by the cable, thereby making the parking brake inoperative.

Further, to install the brake drum, the gap between the inner peripheral surface of the brake drum and the outer peripheral surfaces of the linings 5 is increased and the strut 6 is contracted so that the brake drum can readily be installed. However, the automatic gap adjusting device that is built into the strut 6 makes only a few such gap adjustment at one braking operation (the amount of expansion of the strut 6 made every braking operation is very small). Thus, after the installation of the brake drum with the gap between the inner peripheral surface of the brake drum and the outer peripheral surfaces of the linings 5 being sufficiently large, the braking operation (the operation of pulling the cable and turning the parking lever 4) must be repeated many times to have the gap between the linings 5 and the brake drum properly adjusted, thereby entailing cumbersome work.

Although Unexamined Japanese Utility Model Application (OPI) No. 96825/1982 (the term OPI as used herein means "Unexamined Published Application") discloses a device that properly adjusts the gap with only one braking operation after the installation of the brake drum, its structure is relatively complicated, making it not readily practical.

The drum brake according to the present invention overcomes the above-described shortcomings.

SUMMARY OF THE INVENTION

A drum brake according to the present invention comprises, similarly to the conventional drum brake; a brake drum that rotates along with wheel, a backing plate fixed on a suspension system; a pair of brake shoes that are pressed onto the inner peripheral surface of the brake drum by being a wheel cylinder fixed on the backing plate; a parking lever, one end of which is pivotably supported by one of the pair of brake shoes and the other end of which is connected to a cable for operating a parking brake mechanism; and a strut having a built-in automatic gap adjusting device for adjusting the gap between the outer peripheral surfaces of the brake shoes and the inner peripheral surface of the brake drum as the linings of the brake shoes wears by expanding the strut to cause one end of the strut to abut against the middle of the parking lever and the other end of the strut to abut against the other brake shoe.

Further, a drum brake according to the present invention is provided with not only a plate spring secured to a portion located on part of the backing plate and through which the other end of the parking lever passes but also a bent stopper portion on the tip of this plate spring, for allowing passage of the other end of the parking lever in only the direction of cable pull, unless the bent stopper portion is manually displaced. The bent stopper portion is displaceable from outside the backing plate.

A drum brake according to the present invention performs the braking operation for cars. Its parking brake operation is the same as in the case of the above-described conventional drum brake. However, this drum brake allows the gap between the inner peripheral surface of the brake drum and the outer peripheral surfaces of the linings of the brake shoes to be properly adjusted by only one braking operation after installation of the brake drum, even if the gap is large.

The bent stopper portion arranged on the tip of the plate spring is of such a shape that the bent stopper portion allows the other end of the parking lever to pass therethrough only when the cable is pulled. Thus, when the brake drum is installed with the parking lever turned so that a sufficiently large gap can be provided and the other end of the parking lever is pulled by the cable, the other end passes by the bent stopper portion, elastically deforming the plate spring. After the passage, the other end of the parking lever comes into engagement with the bent stopper portion of the plate spring and the amount of turning of the parking lever is restricted, thereby properly reducing the gap between the inner peripheral surface of the brake drum and the outer peripheral surfaces of the linings of the pair of brake shoes.

To remove the brake drum, the bent stopper portion is displaced from outside the backing plate disengaging the bent stopper portion from the other end of the parking lever. The parking lever can then be sufficiently turned in the direction of releasing the braking force to increase the gap between the outer peripheral surfaces of the brake shoes and the inner peripheral surface of the brake drum. Thus, the brake drum can be removed with ease.

With the foregoing in mind, other objects, features and advantages of the present invention will become more apparent upon consideration of the following description and the appended claims with reference to the accompanying drawings, all of which form part of this specification, wherein like reference numerals designate corresponding parts in the various figures.

DETAILED DESCRIPTION OF THE INVENTION

Figure 5:
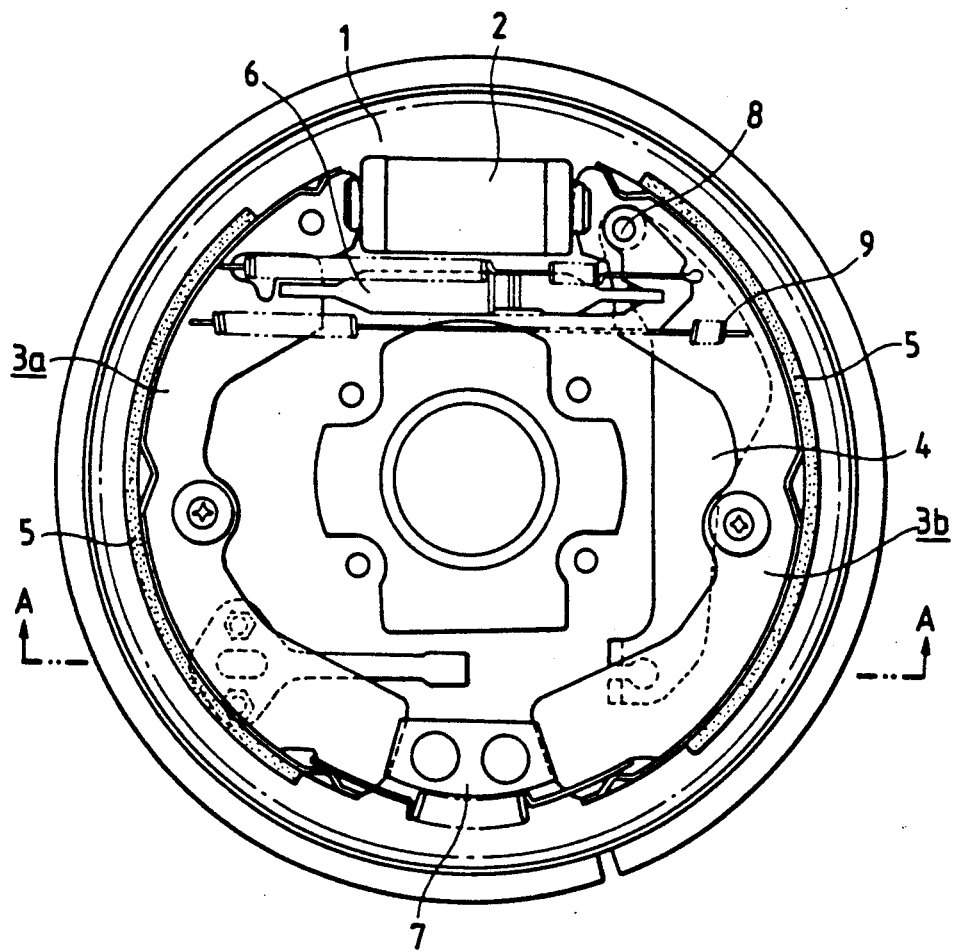
FIG. 5 (Prior Art) is a front view showing an example of a drum brake to which this device can be applied.
Figure 6:
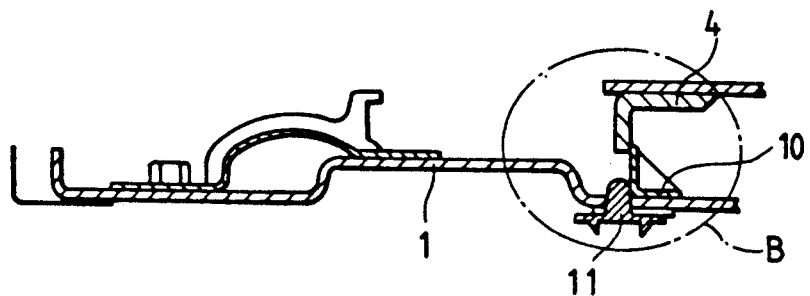
FIG. 6 (Prior Art) is a sectional view taken along line A—A of FIG. 5 (Prior Art).

A drum brake according to the present invention comprises, similarly to the conventional drum brake shown in FIG. 5 (Prior Art), a brake drum that rotates along with wheel, a backing plate 1 fixed on a suspension system, a pair of brake shoes 3a and 3b that are pressed against the inner peripheral surface of the brake drum by a wheel cylinder 2 which is displaceably supported by the backing plate 1, a parking lever 4, one end of which is pivotably supported by one brake shoe 3b through a pivot pin 8 and the other end of which is connected to a cable for operating a parking brake mechanism, and a strut 6 having a built-in automatic gap adjusting device for adjusting the gap between the outer peripheral surfaces of the brake shoes and the inner peripheral surface of the brake drum as linings 5 of the brake shoes 3a and 3b wear by causing one end of the strut to abut against the middle of the parking lever 4 and the other end of the strut to abut against the other brake shoe 3a.

In a drum brake according to the present invention, the base end (left end as viewed in FIGS. 1 through 4) of a plate spring 12 is fixed by a rivet 13 to backing plate 1 (lower middle as viewed in FIG. 5 (Prior Art)) and through which the other end of the parking lever 4 (bottom end as viewed in FIG. 5 (Prior Art)) passes by pulling the cable. The tip of this plate spring 12 (right end as viewed in FIGS. 1 through 4) is formed into a bent stopper portion 14 by being bent at an acute angle in the direction opposite the backing plate 1. As a result, the bent stopper portion 14 allows a bent edge 16 to pass only in a case where the parking lever 4 is pivoted counterclockwise. A hole 15 is formed in the backing plate 1 adjacent the bent stopper portion 14 so that a tool 17 (FIG. 4) inserted into the inside of the backing plate 1 through this hole 15 can be used to displace bent stopper portion 14.

Since a drum brake according to the present invention performs the same braking operation and parking brake operation as the conventional drum brake, their descriptions will be omitted to avoid repetition.

A drum brake according to the present invention allows the gap between the inner peripheral surface of the brake drum and the outer peripheral surfaces of the linings 5 to be properly adjusted with only one braking operation after installation of the brake drum even if the gap is large.

Figure 1:
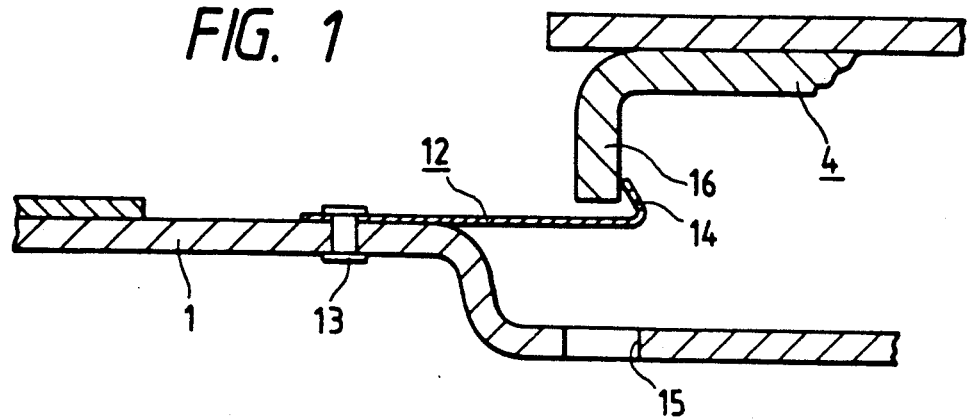
FIG. 1 is a sectional view showing the main portion of the drum brake according to this device.
Figure 2:
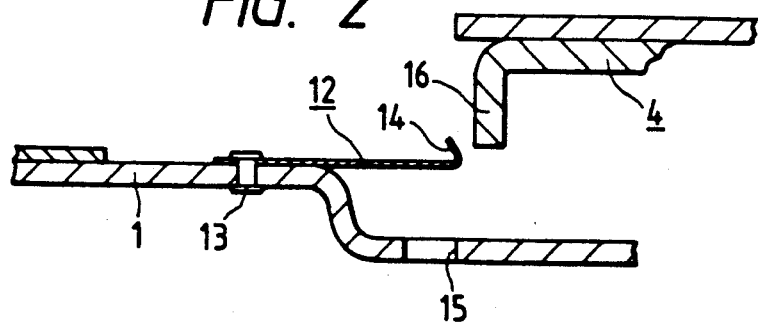
FIG. 2 is a sectional view showing the process of properly adjusting the gap between the inner peripheral surface of a brake drum and the outer peripheral surfaces of a lining after the brake drum has been installed.
Figure 3:
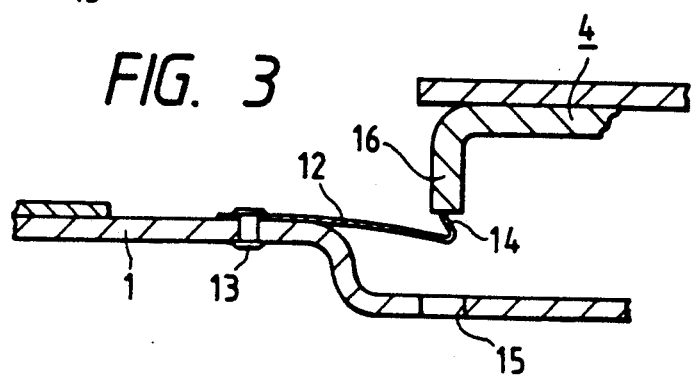
FIG. 3 is a sectional view showing the process of properly adjusting the gap between the inner peripheral surface of a brake drum and the outer peripheral surfaces of a lining after the brake drum has been installed.

To install the brake drum, the parking lever 4 is set to the non-braking side (counterclockwise as viewed in FIG. 5 (Prior Art)) so that it can be turned sufficiently to disengage the bent edge 16 from the tip of the plate spring 12. The gap between the outer peripheral surfaces of the linings 5 and the inner peripheral surface of the brake drum is sufficiently large under this condition to facilitate the brake drum installation work. When the brake drum has been installed, the other end of the parking lever 4 is pulled by the cable and the parking lever 4 is pivoted clockwise around the pivot pin 8. As a result, the bent edge 16 arranged on the other end of the parking lever 4 passes by the bent stopper portion 14 on the tip of the plate spring 12, as shown in FIG. 3, causing the plate spring 12 to elastically deform.

After the bent edge 16 has passed the bent stopper portion 14, the bent edge 16 engages with the bent stopper portion 14, thereby restricting the amount of rotation of the parking lever 4 in the direction of releasing the braking force. This reduces the gap between the inner peripheral surface of the brake drum and the outer peripheral surfaces of the linings 5. Accordingly, the gap is properly adjustable with only one braking operation even after installation of the brake drum facilitated by providing a large gap.

Figure 4:
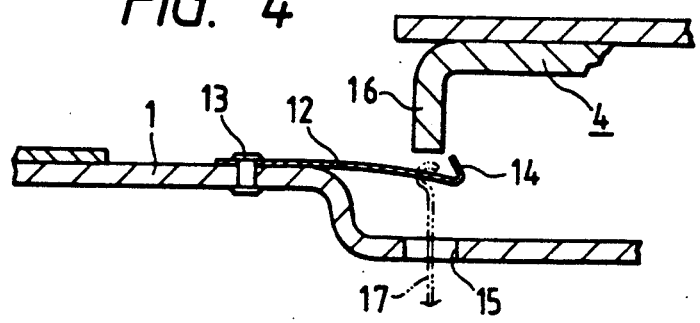
FIG. 4 is a sectional view showing the disengaging of the bent stopper of a plate spring from the end portion of a parking lever when the brake drum is removed.

To remove the brake drum to replace the brake shoes 3a and 3b, the bent stopper portion 14 is pulled from outside the backing plate 1 using the tool 17 inserted through the hole 15 as shown in FIG. 4. The bent stopper portion 14 is thus disengaged from the bent edge 16. As a result, the parking lever 4 can be rotated in the direction of releasing the braking force and the brake shoes 3a and 3b returned toward the middle of the backing plate 1 by the return spring 9, thus increasing the gap between the outer peripheral surfaces of the linings 5 and the inner peripheral surface of the brake drum to facilitate the removal of the brake drum.

A drum brake according to the present invention allows the brake drum to be installed and removed easily by increasing the gap between the inner peripheral surface of the brake drum and the outer peripheral surfaces of the linings of the brake shoes with the additional advantages of simple design and low cost. It also allows the gap to be properly adjusted with only one braking operation after the installation of the brake drum. Further, since the plate spring can be left fixed on the backing plate, there is no need to check that the plate spring is installed before use, and the likelihood that the parking brake will not work by erroneously locating the parking lever will be precluded.

While the invention has been described in accordance with what is presently conceived to be the most practical and preferred embodiment, it is to be understood that the invention is not to be limited to the disclosed embodiment but on the contrary, is intended to cover various modifications and equivalent arrangements included within the spirit and the scope of the appended claims, which scope is to be accorded the broadest interpretation of such claims so as to encompass all such equivalent structures.

What is claimed is:

1. A drum brake comprising:
   a rotating brake drum;
   a pair of brake shoes that are pressed against an inner peripheral surface of said brake drum by a wheel cylinder fixed on a backing plate;
   a parking lever, one end of which is pivotally supported by one of said brake shoes and the other end of which is connected to a cable for operating a parking brake mechanism;
   a strut, one end of which abuts against a middle of said parking lever and another end of which abuts against the other of said brake shoes, said strut having a gap adjusting mechanism for adjusting a gap formed due to wear of the linings of said brake shoes; and
   a plate spring attached to said backing plate, said other end of said parking lever passing by said plate spring when said cable is pulled, said plate spring having a bent stopper portion for permitting said other end of said parking lever to pass only when said cable is pulled in one direction, said bent stopper portion being displaceable from outside said backing plate to allow passage of said other end of said parking lever in a direction opposite the direction of cable pull.

2. A drum brake according to claim 1 wherein said bent stopper portion is displaceable by means of a tool inserted through an aperture in said backing plate.

* * * * *